US005721582A

United States Patent [19]

Bridges

[11] Patent Number: 5,721,582
[45] Date of Patent: Feb. 24, 1998

[54] PRINTER WITH VACUUM SHOE AND MEDIA CUT OFF MEMBER THEREIN

[75] Inventor: Mark E. Bridges, Spencerport, N.Y.

[73] Assignee: Eastman Kodak Company, Rochester, N.Y.

[21] Appl. No.: 371,255

[22] Filed: Jan. 11, 1995

[51] Int. Cl.$^6$ ..................................................... B41J 2/435
[52] U.S. Cl. ........................................ 347/262; 347/263
[58] Field of Search ................................ 358/290, 299; 346/136, 134; 347/138, 263, 264, 245, 262, 258, 241, 116, 232, 257

[56] References Cited

U.S. PATENT DOCUMENTS

| | | | |
|---|---|---|---|
| 1,746,407 | 2/1930 | Schroter et al. | 347/258 |
| 2,511,892 | 6/1950 | Wise | 346/24 |
| 3,823,276 | 7/1974 | Maslowski et al. | 347/241 |
| 3,925,607 | 12/1975 | Hauber | 358/491 |
| 3,958,250 | 5/1976 | Rolon | 347/262 |
| 4,260,997 | 4/1981 | Fukui | 347/262 |
| 4,260,998 | 4/1981 | Fukui | 347/255 |
| 4,293,864 | 10/1981 | Scott | 347/257 |
| 4,334,770 | 6/1982 | Landsman | 347/264 |
| 4,479,133 | 10/1984 | Shiozawa et al. | 347/242 |
| 4,479,148 | 10/1984 | Sheck et al. | 358/491 |
| 4,686,541 | 8/1987 | Rosier | 347/262 |
| 4,698,647 | 10/1987 | Gerlach | 347/257 |
| 4,816,923 | 3/1989 | Saotome | 358/494 |
| 5,097,351 | 3/1992 | Kramer | 359/17 |
| 5,101,223 | 3/1992 | Boeve | 347/264 |
| 5,214,528 | 5/1993 | Akanabe et al. | 359/211 |
| 5,329,301 | 7/1994 | Balzeit et al. | 346/134 |
| 5,500,656 | 3/1996 | Behrens et al. | 346/136 |

Primary Examiner—Joseph W. Hartary
Assistant Examiner—Raquel Yvette Gordon
Attorney, Agent, or Firm—Milton S. Sales

[57] ABSTRACT

A printer has a support shoe with an arcuate inner surface for receiving a light-sensitive recording media and a write head assembly to record onto media received on the inner surface of the support shoe. The printer includes a web cutting means at the exit end of the support shoe and means for applying vacuum sequentially (1) to a region of the arcuate inner surface furthest from the web cutting means, (2) to the center region of the arcuate inner surface, and (3) to a region of the arcuate inner surface closest to the web cutting means to thereby force media to wrap around the arcuate inner surface. The vacuum may be applied to a center region of the arcuate inner surface to remove slack in a media segment between the center region and the web cutting means. The vacuum to the center region is left on and the vacuum is applied to a region of the arcuate inner surface furthest from the web cutting means and to the center region of the arcuate inner surface, and then to a region of the arcuate inner surface closest to the web cutting means to thereby force media to wrap around the arcuate inner surface.

10 Claims, 4 Drawing Sheets

PRINTER WITH VACUUM SHOE AND MEDIA CUT OFF MEMBER THEREIN

CROSS-REFERENCE TO RELATED APPLICATIONS

Reference is made to commonly assigned, co-pending U.S. patent applications Ser. No. 08/123,838 entitled LEAD-SCREW COUPLER, filed in the names of Jadrich et al. on Sep. 20, 1993; Ser. No. 08/123,839 entitled METHOD AND APPARATUS FOR EXPOSING PHOTOSENSITIVE MEDIA WITH MULTIPLE LIGHT SOURCES, filed in the names of Smith et al. on Sep. 20, 1993; Ser. No. 08/371,241 entitled DIGITAL PRINTER WITH SUPPORT SHOE AND TRANSLATABLE MEDIA GUIDE EMBER THEREIN, filed concurrently herewith in the name of Mark E. Bridges; and Ser. No. 08/371,347 entitled PRINTER WITH SUPPORT SHOE AND EXIT MEDIA GUIDE MEMBER, filed concurrently herewith in the name of Mark E. Bridges.

BACKGROUND OF THE INVENTION

1. Technical Field

The present invention relates generally to film printers utilizing digitized signals, and more particularly to photographic printers that form web media into a cylindrical shape for exposure by a rotating light source and which subsequently cut the exposed media into sheets.

2. Background Art

Photographic printing of digitized images is accomplished by modulating the intensity of a light SO beam that forms a writing spot on photosensitive media as the beam moves relative to the photosensitive media. One type of printer uses an array of light emitting diodes (LED's) positioned on a rotor which spins within a media support cylinder. The rotor is axially translated through the support cylinder to index the LED array to the next image line or lines. The light emitting diodes can be directly modulated with relatively simple electronic drive circuitry, and can be employed with relatively inexpensive, compact and reliable hardware.

Commonly assigned, co-pending U.S. patent application Ser. No. 08/123,839, filed in the name of Smith et al. on Sep. 20, 1993, discloses a high speed printer capable of producing full color images on conventional photographic paper using digitized information and employing simple and inexpensive light sources. A write head assembly includes a plurality of individually addressable mono-color LED's arranged in columns and rows to emit a plurality of light beams, projection optics, and support electronics. The write head assembly is resident on a rotor which is simultaneously rotated about a fixed axis and linearly translated past stationary photosensitive recording media mounted on the inner surface of a cylindrical "support shoe" to form a plurality of writing spots moving across the photosensitive material in a fast scan direction and in a slow scan direction. The disclosure of the Smith et al. patent is hereby specifically incorporated herein by reference.

When using a printer as disclosed in said U.S. patent application Ser. No. 08/123,839, the photosensitive recording media must be advanced into the support shoe without scratching, and accurately positioned relative to the exposure source while the rotating exposure source traverses the axial length of the cylindrical support shoe. Numerous methods have evolved for manipulating the media relative to the cylindrically formed support shoe during the printing operation.

In U.S. Pat. No. 2,511,892, which issued to Wise on Jun. 20, 1950, the end of a roll is fed through a single-turn drive roller pair. The media is driven between a pair of mandrels and a flexible sheet. The flexible sheet opens and closes about the mandrels, sandwiching the media to the mandrels. A data transfer operation takes place on the exposed portion of media. The flexible sheet is opened after the writing operation and media is driven past a knife, which cuts off a sheet portion from the roll. The flexible sheet is closed over the unexposed media which is still loosely held between the mandrels and the flexible sheet for the next write operation. The use of support mandrels reduces the area of exposable media, increasing waste. If photographic media is used, trapping the media between a mandrel and the flexible sheet can cause emulsion damage at the edge of the media when it is transported into and out of the printer when the flexible sheet is in the open state.

U.S. Pat. No. 3,958,250, which issued to Rolon on May 18, 1976, discloses a printer in which the end of a roll of film is driven into a curved entrance guide shoe. The shoe diverts the film along a curved wall housed within an exposure compartment. When the end of the film has reached the opposite side of the curved wall, a vacuum holds the film to the wall. Forcing the emulsion side of the media against a fixed, curved entrance shoe risks scratches to that emulsion.

U.S. Pat. No. 4,686,541, which issued to Rosier on Aug. 11, 1987, discloses extracting film from a reel with a first set of drive rollers, guiding the film along its edge into a cylindrical support, cutting it, holding the film to a cylindrical cradle with a vacuum, exposing it, engaging another set of rollers (which move out of the paper path when supplying paper to the cradle) to drive the film out of the cradle into yet another set of rollers which drives the sheet into a storage cassette. A take-up roll may be used when it is inappropriate to cut the film into sheets. A fixed sheet size is used, limiting the printer's efficient use of media when doing small images.

In U.S. Pat. No. 4,698,647, which issued to Gerlach on Oct. 6, 1987, the end of a roll of film is fed into a pair of foam covered rollers, around sheet metal deflector guides, up and around two axially adjustable non-rotating mandrels, back through another set of deflector guides and out to another set of foam covered rollers. The mandrels move axially to accommodate different film widths. The rotor/hub sandwich is translated the axial length of the curved film. A film guide cap helps direct the film around the mandrels during the initial loading of film. The mandrels reduce the amount of exposable media. Additional film waste occurs at the ends near the mandrels because travel of the carriage-mounted hub arrangement is limited by the placement and structure of the mandrels. Although the guides and hubs are chromed, an unacceptable level of scratching will undoubtedly occur during film transport and carriage translation.

U.S. Pat. No. 4,816,923, filed by Saotome on Mar. 28, 1989, discloses a scanning device that uses drive rollers to feed a sheet into a cylindrical support. An edge guide at each end of the cylindrical support, spaced to allow insertion of the sheet, steers the sheet until it encounters a stop. Driving the media with a roller pair and edge guiding it downstream of the rollers in the manner prescribed can result in damage to the media due to misalignment of the rollers relative to the edge guides as taught by exact constraint principles. Damage can also occur if frictional properties between the rollers and the media change due to humidity or another type of media is used that has a different thickness or substrate/emulsion composition. All media have the property of beam stiffness. When media is forced up to the type of stop disclosed, a short portion at the end of the media will remain straight, that is, will not follow the curvature of the cylindrical support. The length of the straight portion is dependent upon the tangential force exerted by the drive rollers, the stiffness of the media, radius of intended curvature, and the co-efficient of friction between the media and the support. As the straight portion is no longer in intimate contact with the support, it will have an out-of-focus condition unless the optics have an extremely long depth of focus. Long depth of focus focal systems tend to operate slower than those with shallow depth of focus. System performance is therefore diminished utilizing the method described. If the portion of media adjacent the stop is not used because of the beam stiffness problem, waste occurs. Also, the media edge abutting the stop can be damaged if the force exerted by the rollers is too high. Conversely, roller slippage will occur if nip force is too light, causing both abrasive damage to the media emulsion and inaccurate registration.

DISCLOSURE OF THE INVENTION

According to a feature of the present invention, a printer having a support shoe with an arcuate inner surface for receiving a light sensitive recording media and a write head assembly to record onto media received on the inner surface of the support shoe, includes a web cutting means at the exit end of the support shoe and means for applying vacuum sequentially (1) to a region of the arcuate inner surface furthest from the web cutting means, (2) to the center region of the arcuate inner surface, and (3) to a region of the arcuate inner surface closest to the web cutting means to thereby force media to wrap around the arcuate inner surface.

According to a preferred embodiment of the present invention, the arcuate inner surface of the support shoe is at least partially cylindrical. The vacuum-applying means includes a plurality of openings through the support shoe to communicate the arcuate inner surface with a plurality of vacuum manifolds. The openings through the support shoe may be radial slots in the support shoe.

According to another feature of the present invention, (1) the vacuum is applied to a center region of the arcuate inner surface to remove slack in a media segment between the center region and the web cutting means. The vacuum to the center region is left on and the vacuum is applied to a region of the arcuate inner surface furthest from the web cutting means and to the center region of the arcuate inner surface, and then to a region of the arcuate inner surface closest to the web cutting means to thereby force media to wrap around the arcuate inner surface.

The invention, and its objects and advantages, will become more apparent in the below description of the preferred embodiments.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
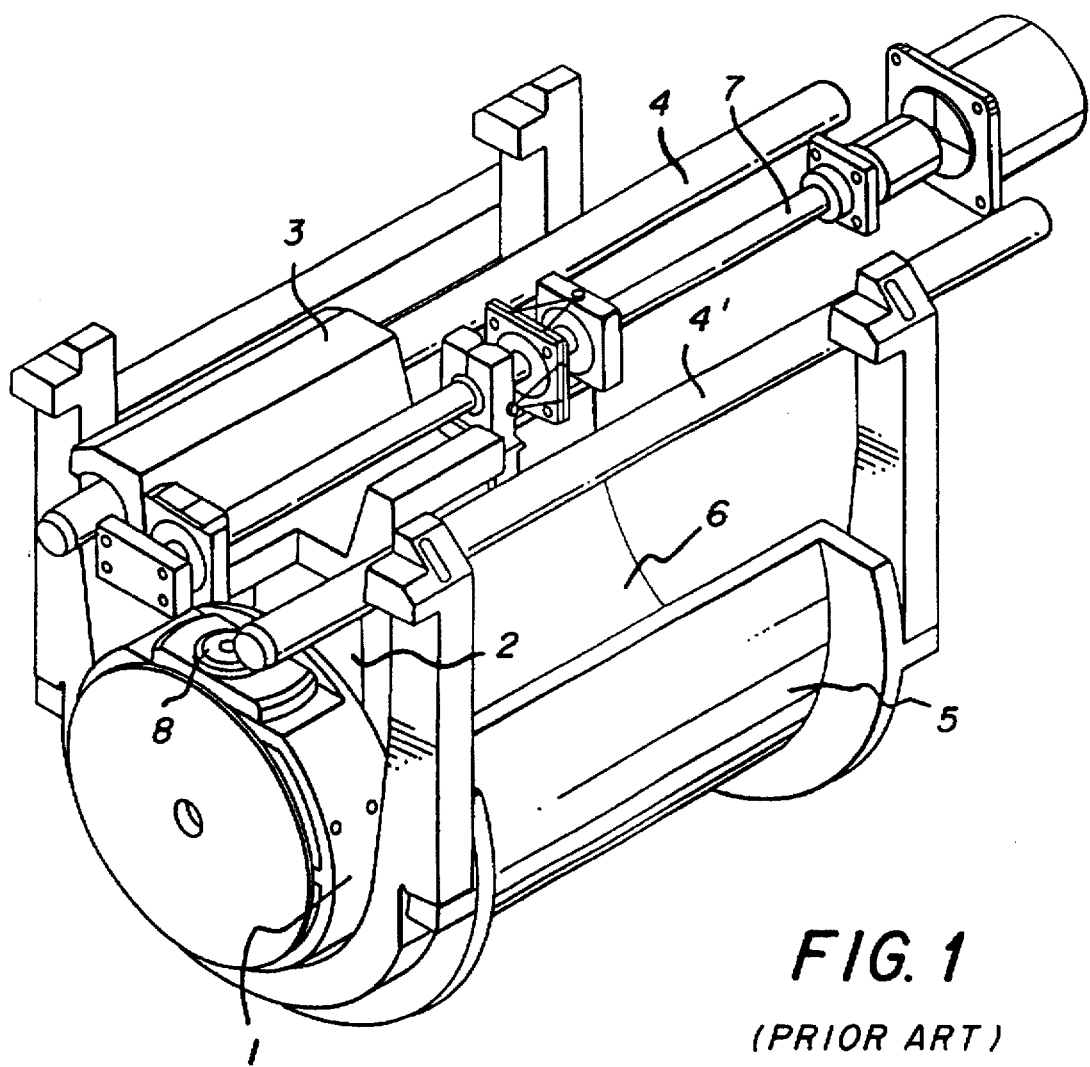
FIG. 1 a perspective view of a rotary printing system according to the prior art.

A rotary printing system employing a multi-position lens assembly is illustrated in FIG. 1, and includes a rotor 1 coupled to a drive motor, not shown, supported by a rotor support member 2 which hangs from a carriage assembly 3 which is supported for movement along a pair of guide rods 4 and 4'. The rotor is arranged to spin and move axially within a cylindrical support shoe 5 which is provided with a sheet of photosensitive material on the inner surface 6 thereof. Rotor 1 is attached to a linear translation assembly comprising rotor support member 2, carriage assembly 3, and a lead screw 7 driven by a stepper motor. See commonly assigned, co-pending U.S. patent application Ser. No. 08/123,838 entitled LEADSCREW COUPLER, filed in the names of Jadrich et al. on Sep. 20, 1993, now U.S. Pat. No. 5,392,662. The rotor is simultaneously rotated by the drive motor in a fast scan direction and is translated past the cylindrical support shoe in the slow scan direction (axially) by the stepper motor and lead screw 7, thereby achieving a raster scan pattern on the photosensitive media held within the support shoe.

An LED printhead assembly 8 is mounted in rotor 1 and comprises a plurality of mono-color light sources such as an array of LED's and a projection lens assembly. The printhead assembly is located within the body of rotor 1 with the LED array package positioned so that the LED aperture output surface is located in a plane which is perpendicular to the optical axis of the projection lens assembly. The projection lens assembly is arranged to simultaneously image (focus) all of the LED's in the array onto a surface located in close proximity above the outer surface of the rotor, and more particularly, onto the inner surface of the photosensitive material held by support shoe 5. A single projection optics lens array thereby images the plurality of LED's onto the photosensitive material as a plurality of individual images which constitute the writing beams that expose the image pixels. Additional details of the LED array and the generation of pixel control signals can be found in aforementioned U.S. patent application Ser. No. 08/123,839, now U.S. Pat. No. 5,392,662.

Figure 2:
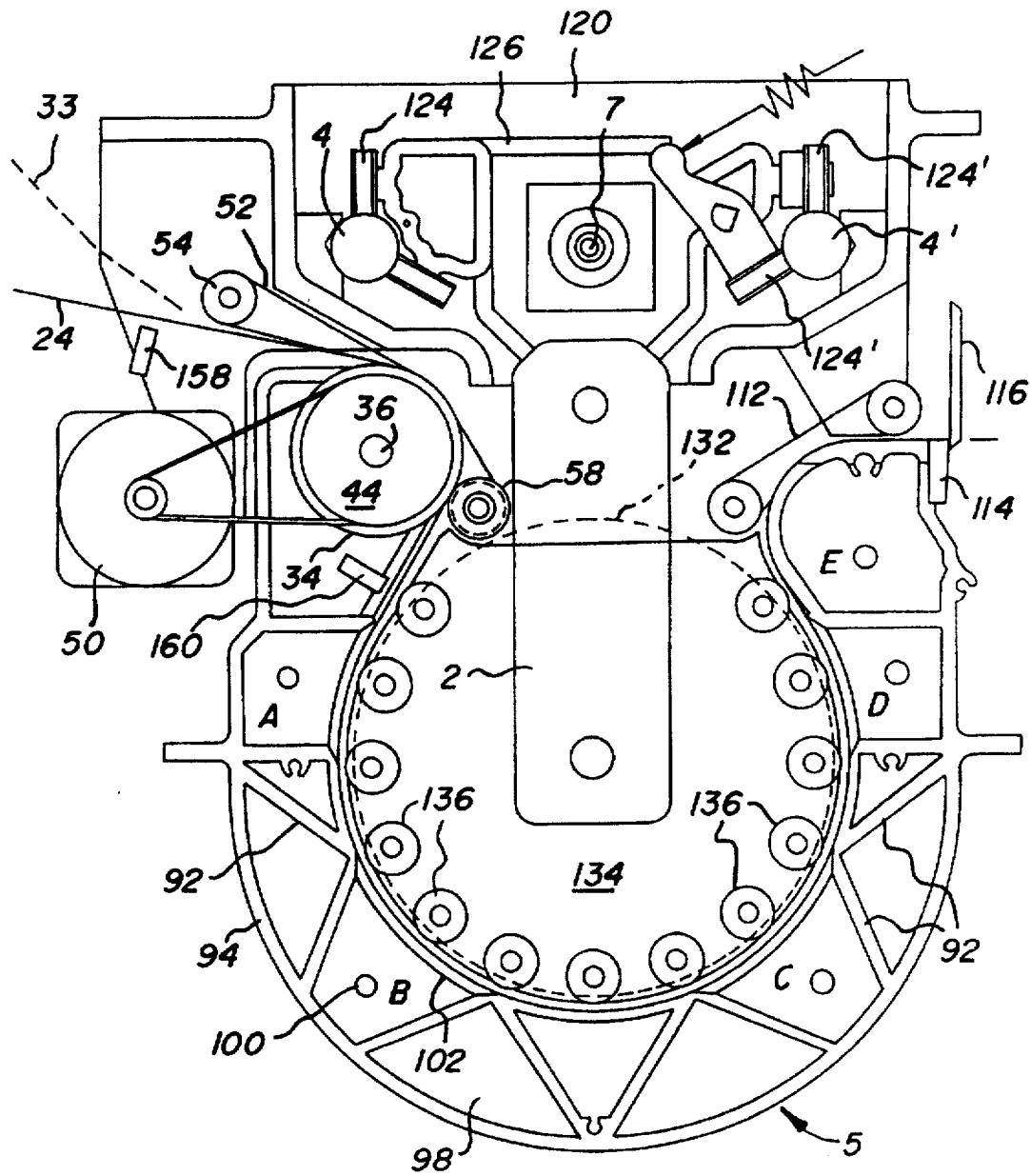
FIG. 2 shows a general schematic illustration of apparatus according to a preferred embodiment of the present invention.
Figure 3:
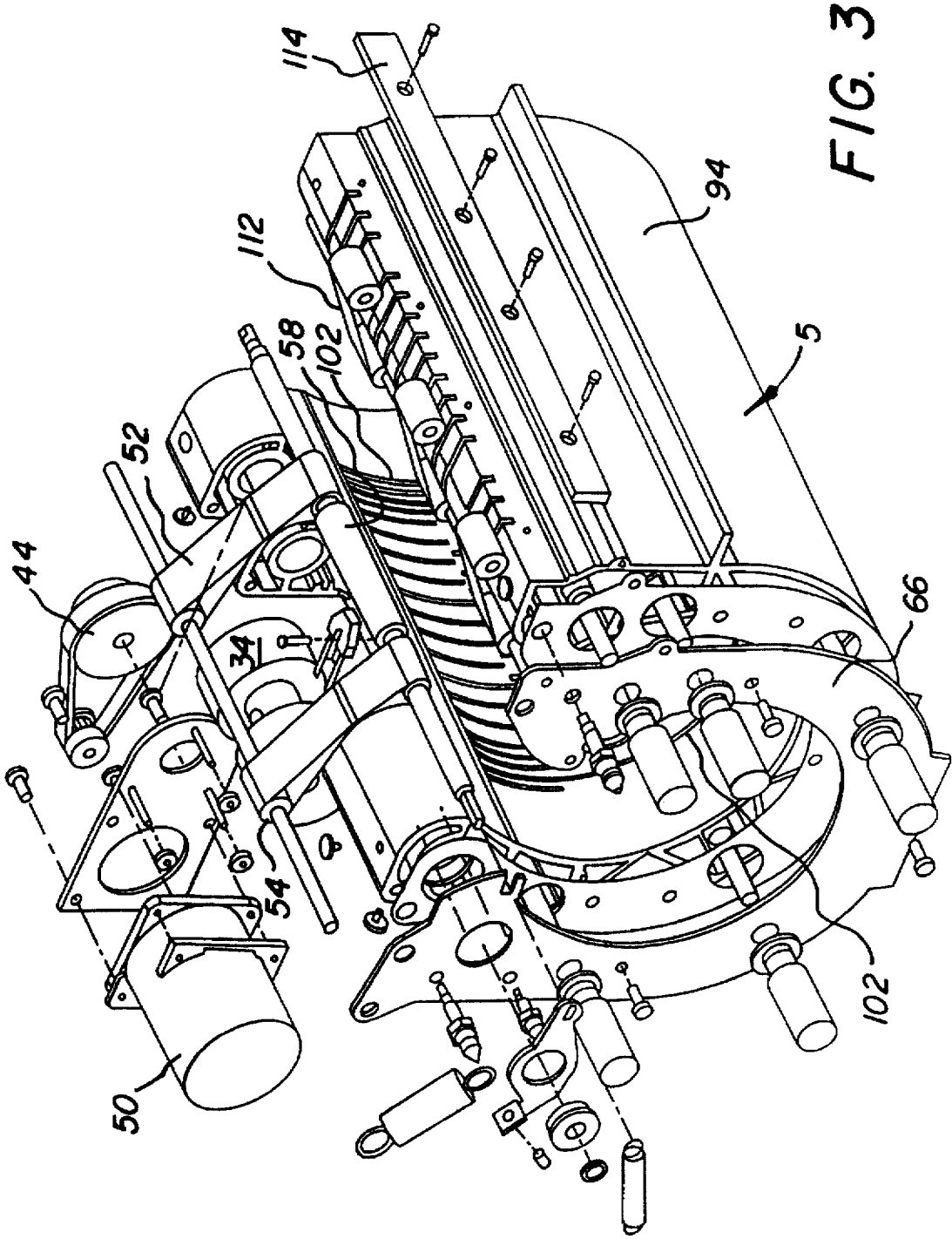
FIG. 3 is an exploded assembly view of the apparatus shown in FIG. 2.

Referring to FIGS. 2 and 3, from a paper advance (such as described in my commonly assigned, co-pending U.S. patent application Ser. No. 08/371,241 entitled DIGITAL PRINTER WITH SUPPORT SHOE AND TRANSLATABLE MEDIA GUIDE MEMBER THEREIN, filed concurrently herewith; the disclosure of which is specifically incorporated herein by reference) a web 24 of media is lead to a metering mechanism illustrated and described in detail in said application entitled DIGITAL PRINTER WITH SUPPORT SHOE AND TRANSLATABLE MEDIA GUIDE MEMBER THEREIN. Briefly, a metering roller 34 is supported on a metering roller shaft 36. At the end of shaft 36 is a pulley 44 which is rotatably driven by a stepper motor 50.

Situated about metering roller 34 is a series of pliable media guide belts 52 which are rotatably, but not drivenly, mounted to a corresponding set of guide belt pulleys 54. Media guide belts 52 also loop around a pressure roller 58. Pressure roller 58 urges media 24 into contact with metering roller 34.

Cylindrical support shoe 5 is constructed so that numerous intermediate walls 92 and an outer wall 94 form individual triangularly-shaped manifold chambers A, B, C, D, and E, and non-manifold chambers 98, all of which contribute substantially to the self-rigidity of cylindrical support shoe 5. Two end caps (only end cap 66 is shown in FIG. 3) are secured at each end of support shoe 5 and have holes 100 opening onto manifold chambers A to E, to which are attached means to selectively connect a vacuum source, not shown.

The arcuate inner surface of cylindrical support shoe 5 is precisely bored so that illumination means, not shown, mounted on the rotor focus on the emulsion side of media 24. The arcuate inner surface and bores for metering roller shaft 36 are bored on the same fixture so that their axes are parallel with each other. The arcuate inner surface of support shoe 5 has radial slots, best seen in FIG. 3, which communicate the vacuum distributed by manifold chambers A to E to the back side of media 24. The vacuum intimately holds media 24 to the arcuate inner surface. The trailing edge of the arcuate inner surface is tangent to essentially cylindrical manifold chamber E, which is provided with radial slots 102 to communicate the vacuum distributed by manifold chamber E to the back side of media 24.

A second set of media guide belts 112, rotatably supported, but not driven by, guide belt pulleys, serve to guide media 24 around cylindrical manifold chamber E. A first cutting edge 114 of a knife is attached to cylindrical support shoe 5. A second cutting edge 116 is slidably mounted to impinge upon first cutting edge 114 to thereby create knife means to separate a media sheet from media web 24.

Carriage Assembly

A translator base assembly 120 is attached via vibration absorbing mounts, not shown, to the framework of the light-tight cabinet 10 and supports guide rods 4 and 4'. Two sets of wheels 124 and 124' are rotatably attached to a carriage 126 which translates along guide rods 4 and 4' by means of lead screw 7 turned by a lead screw motor, not shown. See afore-mentioned U.S. patent application Ser. No. 08/123,838 entitled LEADSCREW COUPLER. Rotor support member 2 is exactly constrained to carriage 126, and carries a rotor 132 depicted by the dashed circle within which is mounted the illumination means, not shown. Also attached to rotor support member 2 is a media guide member 134 that carries a plurality of rollers 136 angularly distributed around the periphery of media guide member 134. Rollers 136 are arranged such that a space gap is created between the outer diameter of rollers 136 and arcuate inner surface 6. The space gap is larger in diameter than rotor 132 so as to prevent media 24 from encountering rotor 132 during media transport operation or rotor translation.

Media exiting knife means 114, 116 is directed to either a waste container or to the entry of a media transport assembly, which is better described in my commonly assigned co-pending U.S. patent application Ser. No. 08/371,347; entitled PRINTER WITH SUPPORT SHOE AND EXIT MEDIA GUIDE MEMBER, and filed concurrently herewith; the disclosure of which is specifically incorporated herein.

Loading

An exposed leader of media 24 is urged into a guide way formed by media guide belt 52 and metering roller 34. A sensor means 158 determines the presence of media 24 in it's location and signals metering roller 34 to drive in a clockwise direction. This has the effect of drawing media 24 into the nip between metering roller 34 and pressure roller 58. A second sensor means 160 is located downstream of the roller nip and turns off drive signals to metering roller 34 when the leading edge of media 24 is present.

Because the leader of media 24 has been exposed, it must be removed prior to initiating a print cycle. Carriage 126, carrying rotor support member 2 and rotor 132, is caused to translate along guide rods 4 and 4' until media guide member 134 is at a point approximately midway down the axis of the arcuate inner surface of support shoe 5.

Metering roller 34 is rotated by stepper motor 50 in response to control signals which causes media 24 to be driven into the space gap created by rollers 136 of media guide member 134 and the cylindrical support surface of support shoe 5. At the end of the arcuate inner surface, media 24 is urged between the second set of media guide belts 112 and cylindrical manifold chamber E, and then past knife cutting edge 114.

Application of Vacuum

When stepper motor 50 stops driving, vacuum is applied to manifold chamber C. This has the effect of drawing media 24 away from chambers A, B, D, and E as media 24 immediately adjacent chamber C is drawn into intimate contact with the arcuate inner surface, thus removing most of the slack in the segment of media 24 between metering roller 34 and chamber C. Vacuum is then applied to chamber A, which causes the media segment to become taught and in intimate contact with the arcuate inner surface close to metering roller 34; where the web is most accurately aligned with respect to the axis of the roller and the arcuate surface of shoe 5. Vacuum to chamber C is then turned off. Vacuum to chamber B is initiated, then C, then D, then E. The sequential actuation of the chambers forces media 24 to wrap around arcuate inner surface 6 from metering roller 34 to first knife cutting edge 114, pushing air ahead of it. The "wiping" action prevents air bubbles from forming between the arcuate inner surface and the back surface of media 24, but, perhaps more importantly, accurately aligns the web with inner surface 6 of support shoe 5.

Cutting

Knife cutting edge 116 is then slidably actuated to impinge upon and rotate about first cutting edge 114. This separates media 24 into a small sheet, which advances to a waste container, not shown. Vacuum is discontinued to all chambers A to E, releasing the intimate bond to the arcuate inner surface of support shoe 5. Metering roller 34 is then driven another predetermined number of steps and the vacuum sequence described above is again initiated and followed by operation of the knife means. This occurs until all that portion of media 24 which was exposed during the loading operation is in the waste container.

When all exposed leader media is parted from media web 24, metering roller 34 is driven counter-clockwise the number of steps that corresponds to the arcuate length between cutting edge 114 and the end of the arcuate inner surface. As the media is driven in this reverse direction, a slack loop 33, depicted by dashed line in FIG. 2, is formed in the media ahead of the entrance to metering roller 34.

A sequential vacuum is then applied in the manner described above. That is, first C, then A, etc. Carriage 126 is driven by lead screw 7 so that illumination means on rotor 132 are aligned with the edge of media 24 in the arcuate inner surface. Printing now occurs by moving carriage 126 down rods 4 and 4' while rotor 132 spins with the illumination means precisely exposing media 24 in response to signals delivered from image storage means, not shown.

At the conclusion of exposure, carriage 126 is caused to translate in a reverse direction along guide rods 4 and 4' until media guide member 134 is at a point approximately midway down the length of the arcuate inner surface axis. Vacuum is discontinued so media 24 can be moved. Metering roller 34 is driven so that the leading edge of media 24 is moved to a media transport assembly, as described in my aforementioned U.S. patent application entitled PRINTER WITH SUPPORT SHOE AND EXIT MEDIA GUIDE MEMBER. When media 24 has been driven into the media transport assembly an appropriate number of steps that corresponds to the image length plus the arcuate length between end of arcuate support 106 and cutting edge 114, vacuum is again sequentially initiated and the exposed portion is cut with knife means 114, 116.

Preferably, the image is over-written to assure that the image fills the exposable surface of media 24. Thus, vacuum is discontinued and media 24 is advanced a small number of steps corresponding to the over-written portion plus a minimal buffer amount to provide an unexposed edge for the ensuing print. Vacuum is drawn as stated above, and the over-write portion is severed from the web of media 24 by knife means 114, 116. The severed, unexposed edge falls into the waste container.

Vacuum is again released, and media of a length corresponding to the distance between end of the arcuate inner surface and cutting edge 114 is again withdrawn onto the arcuate inner surface. Vacuum is re-applied in the manner described above and the ensuing exposure is made.

Figure 4:
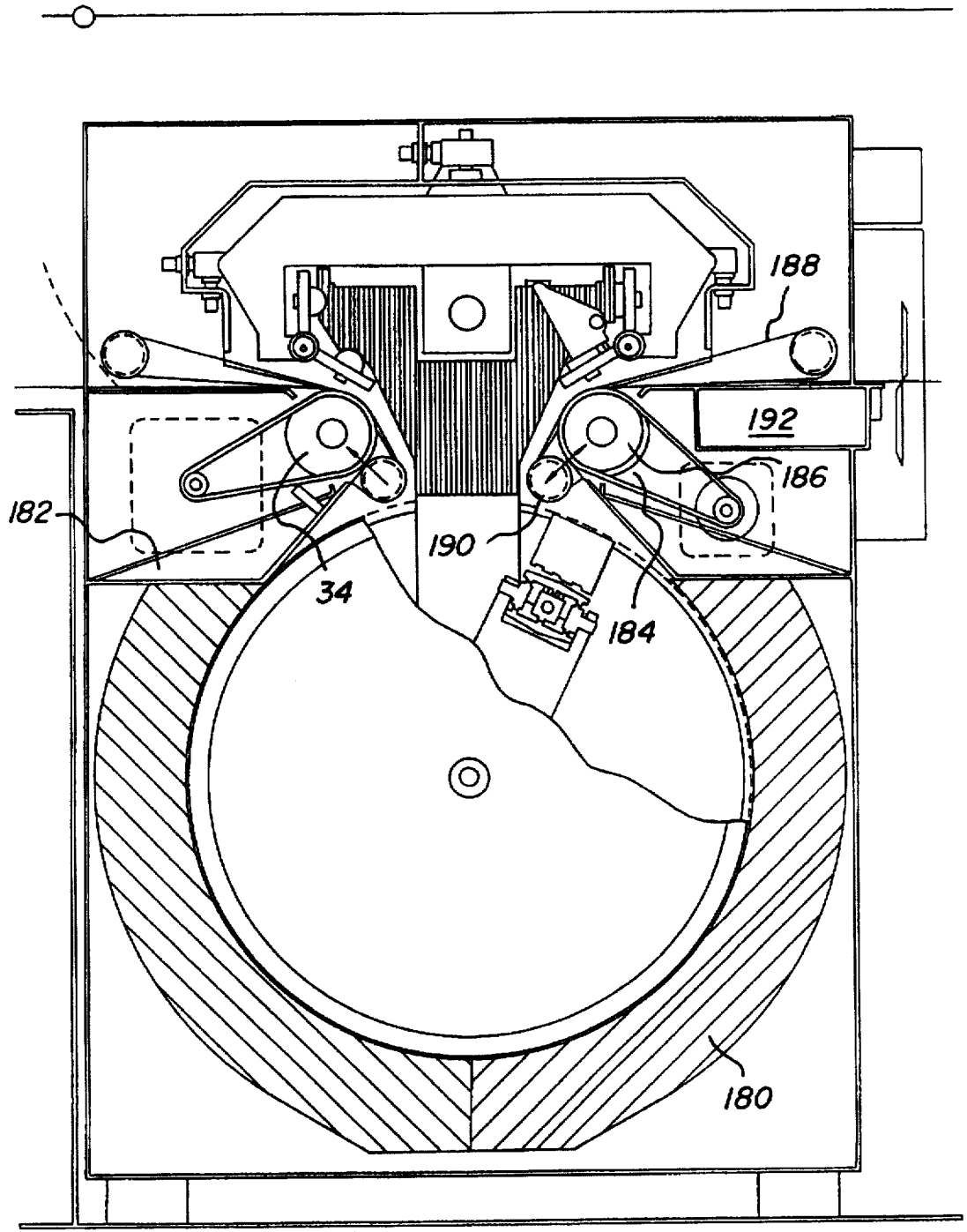
FIG. 4 is a schematic illustration similar to FIG. 2, showing another preferred embodiment of the present invention.

FIG. 4 is a view similar to FIG. 2, showing another preferred embodiment of the present invention. The two embodiments are generally quite similar, but there are several distinctions to be noted herein. Specifically, the embodiment of FIG. 4 includes a cast or fabricated support shoe 180 rather than the extruded support shoe 5 of the first embodiment. Support shoe 180 includes a series of, say, two vacuum chambers (not shown) and an entrance chamber 182 with a series of perforations to communicate vacuum from the interior of the entrance chamber to the back side of the media. The media is drawn against the entrance chamber wall, which forms a tangent between metering roller 34 and the inner arcuate support surface of shoe 5. Vacuum is ported from entrance chamber 182 to the immediately adjacent section of the support shoe to be communicated to the back surface of the media through a plurality of openings such as slots. The interior configuration of restricts air flow toward the entrance chamber, causing a progression of vacuum around the inner arcuate support surface of the shoe in a counter clockwise direction. Preferably, the second portion of the shoe has an independent vacuum port located immediately adjacent to the interface with the first portion of the shoe.

Also of note, the embodiment of FIG. 4 includes an exit roller mechanism 184 similar to the entrance roller 34 mechanism. The exit roller mechanism includes a driven roller 186 with a low coefficient of friction covering, a series of belts 188, and a movable pressure roller 190 which opens and closes the nip with exit roller 186. The embodiment of FIG. 4 is suitable for use with larger format media than is the first embodiment; the exit roller mechanism being better at controlling movement of wider web. A vacuum box 192 provides the web control that was presented by chamber E of the first embodiment. The vacuum box has a series of holes which communicate vacuum to the back surface of media when present in a cutting position. If media is not present over the holes when vacuum is applied, such as during exposure, the holes are covered by belts 188.

The invention has been described in detail with particular reference to preferred embodiments thereof, but it will be understood that variations and modifications can be effected within the spirit and scope of the invention.

What is claimed is:

1. A printer having (1) a support shoe with an arcuate inner surface for receiving a light sensitive recording media and (2) a write head assembly to record onto media received on the inner surface of the support shoe; said printer further comprising:

means for advancing a web media around the inside of the arcuate inner surface of the support shoe;

web cutting means; and means for applying vacuum sequentially (1) to a region of the arcuate inner surface furthest from the web cutting means, (2) then to the center region of the arcuate inner surface, and (3) then to a region of the arcuate inner surface closest to the web cutting means to thereby force media to wrap accurately around the arcuate inner surface, said means for applying vacuum including a plurality of openings through the support shoe, said openings communicating the arcuate inner surface with a plurality of vacuum manifolds.

2. A printer as set forth in claim 1 wherein the arcuate inner surface of the support shoe is at least partially cylindrical.

3. A printer as set forth in claim 1 wherein the openings through the support shoe are radial slots in the support shoe.

4. A printer as set forth in claim 1 wherein the means for sequentially applying vacuum includes a series of restrictive air passages between said regions such that vacuum applied to one of said regions will be thereafter applied to other of said regions.

5. A printer having (1) a support shoe with an arcuate inner surface for receiving a light sensitive recording media and (2) a write head assembly to record onto media received on the inner surface of the support shoe; said printer further comprising:

means for advancing a web media around the inside of the arcuate inner surface of the support shoe;

web cutting means;

means for sequentially (1) applying vacuum to a center region of the arcuate inner surface to remove slack in a media segment between the center region and the web advancing means and (2) next applying vacuum to a region of the arcuate inner surface furthest from the web cutting means and to a region of the arcuate inner surface closest to the web cutting means to thereby force media to wrap around the arcuate inner surface, wherein the means for sequentially applying vacuum includes a plurality of openings through the support shoe, said openings communicating the arcuate inner surface with a plurality of vacuum manifolds.

6. A printer as set forth in claim 5 wherein the arcuate inner surface of the support shoe is at least partially cylindrical.

7. A printer as set forth in claim 5 wherein the openings through the support shoe are radial slots in the support shoe.

8. A printer having (1) a support shoe with an arcuate inner surface for receiving a light sensitive recording media and (2) a write head assembly to record onto media received on the inner surface of the support shoe; said printer further comprising:

means for advancing a web media around the inside of the arcuate inner surface of the support shoe;

web cutting means;

means for sequentially (1) applying vacuum to a center region of the arcuate inner surface to remove slack in a media segment between the center region and the web advancing means, (2) next applying vacuum to a region of the arcuate inner surface furthest from the web cutting means, (3) next mining off the vacuum to the center region, and (4) next applying vacuum from the region furthest from the web cutting means progressively toward the web cutting means to thereby force media to wrap around the arcuate inner surface.

9. A printer having (1) a support shoe with an arcuate inner surface for receiving a light sensitive recording media and (2) a write head assembly to record onto media received on the inner surface of the support shoe; said printer further comprising:

web cutting means;

means for advancing a web media around the inside of the arcuate inner surface of the support shoe to the web cutting means, whereat said web cutting means is operable to trim a leading portion of media from the web;

means, operable after operating of the web cutting means to reverse the direction of web advance to return the leading edge of the web to the exposure region; and means for applying vacuum sequentially (1) to a region of the arcuate inner surface furthest from the web cuffing means, (2) next to the center region of the arcuate inner surface, and (3) next to a region of the arcuate inner surface closest to the web cutting means to thereby force media to wrap around the arcuate inner surface, said means for applying vacuum including a plurality of openings through the support shoe, said openings communicating the arcuate inner surface with a plurality of vacuum manifolds.

10. A method for applying web media to an arcuate inner surface of a printer support shoe, said method comprising the steps of:

advancing a web media around the inside of the arcuate inner surface of the support shoe from an entrance region to an exit region; and sequentially applying vacuum to (1) a region of the arcuate inner surface furthest from the exit region, (2) next a center region of the arcuate inner surface, and (3) next a region of the arcuate inner surface closest to the exit region to thereby force media to wrap around the arcuate inner surface by providing means for sequentially applying the vacuum, the means for sequentially applying the vacuum including a plurality of openings through the support shoe, the openings communicating the arcuate inner surface with a plurality of vacuum manifolds.

* * * * *

UNITED STATES PATENT AND TRADEMARK OFFICE
CERTIFICATE OF CORRECTION

PATENT NO. : 5,721,582
DATED : Feb. 24, 1998
INVENTOR(S) : Mark E. Bridges

It is certified that error appears in the above-identified patent and that said Letters Patent is hereby corrected as shown below:

Column 9, line 6  delete "mining" and insert -- turning --
Column 9, line 26 delete "cuffing" and insert -- cutting --

Signed and Sealed this

Ninth Day of June, 1998

Attest:

BRUCE LEHMAN

*Attesting Officer*  *Commissioner of Patents and Trademarks*